United States Patent [19]
Risdon

[11] 3,880,332
[45] Apr. 29, 1975

[54] FACE SEALING GASSING VALVE FOR PRESSURIZED DISPENSERS AND METHOD FOR INSTALLING IT

[75] Inventor: Merle G. Risdon, Norwalk, Calif.

[73] Assignee: Sterigard Corporation, Santa Ana, Calif.

[22] Filed: Apr. 5, 1973

[21] Appl. No.: 348,308

[52] U.S. Cl. .................................. 222/394; 141/20
[51] Int. Cl. ............................................ B65d 83/14
[58] Field of Search ........ 156/305, 307, 308; 46/90; 141/20, 3, 113; 222/95, 387, 394

[56] References Cited
UNITED STATES PATENTS

| | | | |
|---|---|---|---|
| 3,112,846 | 12/1963 | Hein | 222/402.16 |
| 3,179,309 | 4/1965 | Cope | 222/389 |
| 3,337,091 | 8/1967 | Bartels | 222/95 |
| 3,451,592 | 6/1969 | Bartels | 222/95 |

Primary Examiner—Stanley H. Tollberg
Assistant Examiner—Norman L. Stack, Jr.
Attorney, Agent, or Firm—Christie, Parker & Hale

[57] ABSTRACT

A ring sealing gassing valve of Mylar has one side coated with adhesive and a solvent vent substantially spanning its width. The adhesive is solvent activated from one end to the solvent vent. The valve is placed over a propellant gassing hole in the body of a pressurized dispenser to bond the valve and dispenser together proximate the gassing hole and only in the solvent activated area. The gassing hole is at the apex of a dome-shaped recess over which the valve lies, and a primary seal is developed at the edge of the recess and the valve because of the force of propellant acting on the valve over the recess.

10 Claims, 2 Drawing Figures

FACE SEALING GASSING VALVE FOR PRESSURIZED DISPENSERS AND METHOD FOR INSTALLING IT

BACKGROUND OF THE INVENTION

The present invention relates to pressurized dispensers in general, and, more in particular, to a propellant gassing valve for a pressurized dispenser.

Pressurized dispensers are characterized by the presence of a propellant for forcing a product from the dispenser upon actuation of a dispensing valve. The propellant can either be mixed with the product or it can be separated from the product by a barrier, such as a flexible, thin plastic bag.

One method of pressurizing a pressurized dispenser generally envisions a gassing valve mounted in a propellant injection hole in the bottom of the pressurized dispenser and through which propellant is charged with a propellant injection needle or a pressure injector.

A propellant injection needle is inserted into the interior of a dispenser and propellant is injected into the interior through the needle. A pressure injection forces propellant through a gassing valve and into an interior of the dispenser by pressure alone. Typical propellants are liquids having a vapor pressure at standard temperatures equaling the desired pressure within the dispensers. In one type of gassing valve propellant is pressure injected through a preformed passage in a rubber grommet mounted in a hole in the bottom of the dispenser's body. The grommet is of soft rubber and overlies both the interior and exterior areas of the bottom bounding the hole. A relatively harder plug fills the passage in the grommet after propellant injection. Another type of gassing valve plug merely plugs the hole through which the propellant has previously been injected into the dispenser. A third type gassing valve plug has longitudinal external flutes for the passage of propellant into the dispenser from a pressurized source. After propellant charging, the plug is driven tightly into the bottom hole to close off the flutes to atmosphere.

All of these plugs have an exposed exterior portion which makes it easy to tamper with the plugs. Propellant in a pressurized dispenser is at fairly high pressures and with a plug removed the dispenser can become a missile. In some instances the propellant is flammable and its discharge is obviously dangerous. Moreover, these plug types of gassing valves are relatively expensive to install. The grommet type, for example, requires the installation of a plug after propellant injection. This consumes time and, depending on whether the propellant is a gas after injection, creates the possibility of propellant losses to atmosphere in the interval between propellant injection and plug insertion. The same is true of the other two types as well. Moreover, in the grommet type the hard plug has caused problems with the feeding mechanism used to insert it. The plug is formed from a long length of material by shearing the material after its insertion into the propellant needle passage in the grommet. Residue from this shearing has caused jamming of the feeding mechanism.

Another technique used in pressurizing dispensers is to liquefy the propellant and pour it into the dispenser. This technique avoids the gassing valve problems but requires the maintenance of a dispenser charging line at very low temperatures, say, about −40°F., and even then a considerable amount of propellant is lost by boil-off.

A third technique is to backcharge propellant through the dispensing valve. This process has the advantage of avoiding refrigeration but dictates many of the design features of the dispensing valve and, of course, there is loss of propellant through the stem of the valve. With barrier type dispensers, backcharging cannot be done. In any event, because of the limitations of backcharging, a gassing valve has advantages even in applications where no barrier between product and propellant exists.

An adequate gassing valve must provide an effective seal after the propellant injection needle has been withdrawn. The effectiveness of the seal must be present under relatively extreme conditions. For example, the pressurized dispenser must be able to tolerate temperatures of at least 130°F. for a period of time, say, 2 weeks, without losing propellant. A typical condition has a propellant charged into a dispenser at 70°F. and 55 p.s.i.g. exerting a pressure of 140 p.s.i.g. at 130°F. The problem of providing a seal under these extreme conditions can be readily appreciated when it is realized that a gassing valve must cover the propellant injection hole in the bottom of the dispenser and that the area of the hole must be sealed by the gassing valve against the considerable pressure within the dispenser and over the hole without support from the dispenser's bottom. A gassing valve must also be compatible with its propellant to avoid degradation of the valve. In many instances, even with a barrier, an aromatic dispenser product might permeate through the barrier and get into the propellant chamber. In this instance the gassing valve must be compatible with the permeated product. An example of this permeation problem is alcohol which permeates through some materials used in bag dispensers. Obviously, as well, there should not be any chemical reaction between the gassing valve and propellant which could produce reduced propellant performance and the possibility of product contamination by a compositionally altered propellant.

It is also quite clear that in a highly competitive pressurized dispenser market the gassing valve must be very inexpensive. This means that it must be easily installed as well as being intrinsically inexpensive to produce.

SUMMARY OF THE INVENTION

The present invention provides in a pressurized dispenser an improved gassing valve. In general, the valve has a flap-like support member overlying a gassing hole in the body of the dispenser, typically in a bottom closure end. The flap member has a coating of adhesive on one side. The adhesive is activated only in the area where the flap member is attached to the dispenser body. The inactivated adhesive serves to fill interstices in the dispenser body over which the flap member lies to prevent leakage through leak paths formed by the interstices.

In a more specific form of the present invention the improved ring sealing gassing valve has a flap-like support member with an adhesive layer on one side. The adhesive layer is activated only on one end of the valve. This end is bonded to the dispenser body. The valve overlies a propellant injection or gassing hole in the body. The hole is through a dome-like recess in the body and the valve seals the perimetric edge of the recess. The valve over the recess and the injection hole is unsupported. Propellant pressure acting on this unsupported area causes a considerable force to act at the perimeter of the recess. The valve is of a material sufficiently strong not to yield to propellant pressures and conform to the interior surface of the recess, under normal circumstances. It is thought that the force of the propellant acting on the unsupported area of the valve over the recess extrudes adhesive which forms a barrier on each side of the perimeter of the recess. The barrier aids in preventing propellant migration across the seal and out the gassing hole.

A pressurized dispenser and gassing valve of the present invention is preferably charged with propellant with a pressure injector, although charging with a probe is satisfactory. Pressure injection is preferred because of its high speed, and problems of indexing the gassing hole with a probe are not present. With the pressure injector, the propellant is forced against the valve at a pressure of, say, 400 to 500 p.s.i.g. The valve unseats and bends back from the gassing hole in the direction of the interior of the dispenser. Liquid propellant with a vapor pressure of, say, between 15 and 55 p.s.i.g. is charged into the dispenser in the desired amount and charging is terminated. With termination by virtue of the resiliency of the valve and the pressure within the dispenser, the valve will close down over the gassing hole. The valve operates in the same fashion when an injection probe is used. A probe having a side outlet and a blunt end is preferred over an injection needle because an injection needle might pierce the valve and cause its failure. After propellant charging, the perimetric seal prevents propellant from permeating past the line seal. With the perimetric high force line seal, a condition is avoided where, upon partial depressurization of the dispenser the valve opens because of the force of propellant trapped between the body and the valve.

Under some circumstances the pressure and temperature conditions within the pressurized dispenser may be severe enough to cause partial to total conformity of the gassing valve with the surface of the recess. The seal effected, however, around the perimeter of the recess between the dispenser body and the valve still acts as a barrier against propellant migration out the gassing hole. In the case of total conformity, a second seal between the valve and the dispenser may be formed around the interior perimeter of the gassing hole.

A preferred form of the gassing valve and pressurized dispenser of the present invention provides a solvent vent bordering the area of adhesion between the valve and the pressurized dispenser body to prevent solvent from spreading out of the desired area and activate more adhesive. With the solvent vent, problems of adhesive activation where it is not wanted are avoided. Consequently the gassing valve does not stick closed during gassing. One of the problems of adhesion of the gassing valve to the dispenser body in areas where it is not desired is that the adhesive there permanently stretches during the breaking of the bond and gathers or doubles on itself thereafter because of the backing member. As a result, leak paths form.

A specific form of the gassing valve and the pressurized dispenser of the present invention contemplates that one end only of the valve be attached by an adhesive to a flat portion of the dispenser body, as on a planar surface of a bottom closure end of the dispenser. The valve overlies a domed recess protruding from the dispenser body and the gassing hole passes through the wall of the recess. A vent between the adhered area of the valve and the free portion thereof prevents solvent from flowing into areas where it is not desired. The valve flap member is relatively stiff, as would be provided by a Mylar flap of about 0.010 inches thickness, so that it will resist conforming to the surface of the dome.

The process of the present invention contemplates the attachment of a flap-type gassing valve to a dispenser body by solvent activating an end only of a layer of adhesive which covers an entire side of the valve, and then bonding the activated adhesive and the dispenser body together. Preferably the solvent is prevented from flowing into areas where it is not desired by a solvent vent which vents the solvent from the adhesive.

These and other features, aspects and advantages of the present invention will become more apparent from the following description, appended claims and drawings.

DESCRIPTION OF THE PREFERRED EMBODIMENT

Figure 1:
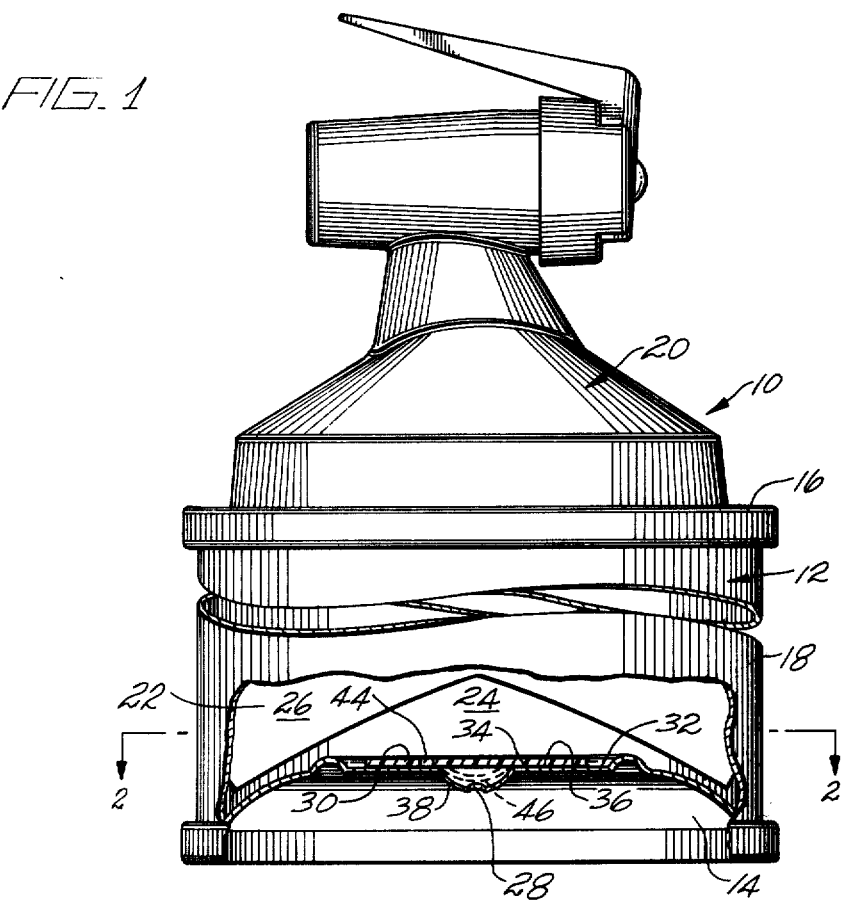
FIG. 1 is an elevational, partly fragmented, partly in half section, and partly broken away view of a preferred pressurized dispenser in accordance with the present invention.

With reference to the Figures, a pressurized dispenser having an improved gassing valve of the present invention is illustrated in general by reference numeral 10. In general the combination comprises a dispenser body 12 closed on its bottom by a bottom closure end 14 and on its top by a dome 16. The bottom closure end and the dome are seamed to a cylindrical body portion 18 of the dispenser in a standard manner. A dispensing valve 20 is mounted on the dome and is selectively actuatable to dispense product from the interior of the dispenser. The dispenser illustrated is of the barrier type although it need not be. The barrier illustrated is a flexible plastic bag 22 attached to the dispenser in the seam joining the dome and the cylindrical dispenser body. The bag has an arch-shaped configuration at its bottom. The interior of the bag receives product and the exterior of the bag receives propellant. Thus the interior of the bag defines a product chamber, and the exterior of the bag and interior of the dispenser body define a propellant chamber. In FIG. 1, the propellant chamber is indicated by reference numeral 24 and the product chamber by reference numeral 26. The arch-shaped configuration at the bottom of the bag, among other things, admits to the passage of a gassing probe through a gassing or propellant injection hole 28 through the bottom closure end and into the propellant chamber without injuring the barrier bag.

A gassing valve 30 is mounted on an interior planar surface 32 on bottom closure end 14. The gassing valve prevents propellant in the propellant chamber from escaping out through the injection hole.

In general, the gassing valve comprises a supporting backing or flap member 34 and a layer of adhesive 36 on the side of the flap member facing the bottom closure end and the gassing hole. The adhesive extends over the entire lower surface of the flap member. Preferably the adhesive is solvent activated, although thermal activated adhesives may be used in applications where the added time required is justified by some other consideration.

Figure 2:
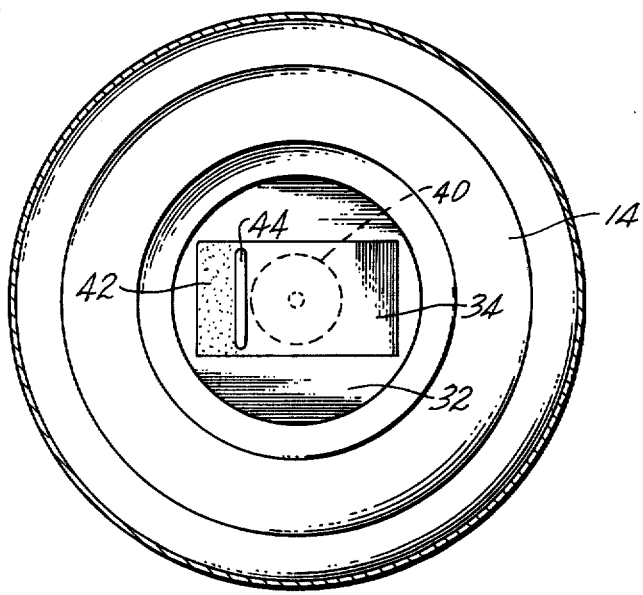
FIG. 2 is a plan view taken generally along line 2—2 of FIG. 1 showing only the dispenser's bottom closure cap and gassing valve.

The bottom closure end has a dome 38, the apex of which is occupied by the injection hole. The dome is concave upward and extends downwardly from the general plane of the surface on which the gassing valve is mounted. The gassing valve is made of sufficiently strong material that it will not, under normal circumstances, deform under propellant pressure into conformity with the interior surface of the dome. A preferred material is Mylar and a suitable thickness is 0.01 inches. Thus in normal environments an area enclosed by a circle of the gassing valve is unsupported by the dispenser body (see FIG. 2). Forces acting on the flap member in this unsupported area will be transferred to the perimeter or edge of the dome, indicated at 40 by the dashed lines of FIG. 2. This force produces a line seal around the perimeter which is effective to prevent propellant migration to any substantial degree past the seal and out of the injection hole.

The bottom closure end is typically covered with an enamel to protect it from corrosion. This enamel as well as the end itself can have small scratches and irregularities which could constitute leak paths between the flap valve and the bottom closure end. The adhesive over the under surface of the valve is soft and pliant and fills these interstices thus preventing leakage at the interface between the valve and the closure end.

As was previously mentioned, the preferred adhesive is solvent activated. Only a portion of the adhesive on the bottom of the valve is so activated. This area is indicated by reference numeral 42 and the stipple in FIG. 2. A solvent vent hole 44 bounds the interior end of the activated area. The balance of the valve is free to deflect upwardly in response to a force acting on it for the admission of propellant into the propellant chamber. In the event that adhesive outside of area 42 were activated, the valve would stick to the surface of the closure end in areas where it was not desired and the valve would not function properly. For example, it might stay closed preventing gassing or it might create a sufficiently strong bond to damage the valve or the gassing equipment during propellant injection. Another example is the permanent set which the adhesive gets when stretched which causes doubling or gathering of the adhesive by the more resilient backing member. This causes leak paths. To avoid the presence of solvent where it is not desired, solvent vent 44 is provided. This vent prevents solvent from spreading past the area of desired adhesion by enabling the solvent to vent upwardly instead of spreading along the interface between the valve and the bottom closure end past the boundary provided by the vent. The vent also dissipates volatile solvent.

In severe environments which can be encountered with the dispenser and the gassing valve of the present invention, considerable deflection of the valve over the recess defined by the dome is possible. These conditions occur, typically, because of elevated pressure and temperature conditions within the dispenser. A certain deflection is shown at 46 by the dashed lines. In even more aggravated cases the valve can be forced into conformity with the surface of the dome. In this instance the seal around the perimeter of the dome and the flat portion of the closure end is still there and effective but another seal around the perimeter of the gassing hole can be formed. The seal at the perimeter of the dome, however, is sufficient to prevent permeation or migration of sufficient propellant into the space between the two seals to cause unseating of the valve with partial depressurization of the dispenser, the latter occurring when the dispenser is used. In other words, when propellant is trapped beneath the valve and the pressure above the valve is relieved, there is a possibility that the valve will unseat with the loss of propellant pressure from the propellant chamber. This possibility is avoided by the seal at the perimeter of the dome.

As previously mentioned, the preferred material of the supporting backing portion of the valve is Mylar, though other plastic materials can be used. An important characteristic of Mylar is that it is relatively stiff and will resist the tendency to conform to the surface of the dome. Such materials as polypropylene, polyethylene and Surlyn conform to the dome relatively rapidly. A suitable adhesive is manufactured by the Minnesota Mining and Manufacturing Company and is identified by them as 3M-1099. This is a nitrile rubber-based adhesive with a methylethylketone vehicle. The ketone is a volatile vehicle. When applied to the backing portion of the valve the vehicle will evaporate leaving a non-tacky layer of adhesive. The non-tacky layer is soft and pliant. The adhesive is activated in area 42 by a suitable solvent and the valve bonded to the flat surface of the bottom closure end. Again the solvent vent vents excessive solvent which would otherwise spread into areas where adhesion is not desired.

The present invention has been described with reference to a certain preferred embodiment. The spirit and scope of the appended claims should not, however, necessarily be so limited.

What is claimed is:

1. In a pressurized dispenser of the type adapted to maintain a product under pressure for selective dispensation through a dispensing valve and having a bottom closure end with a gassing hole, an improved gassing valve for the admission of a pressurizing propellant into the dispenser through the gassing hole comprising:
   a. a supporting backing member of sufficient stiffness for the return of the member to its original position after charging the dispenser with the pressurizing propellant;
   b. a layer of adhesive substantially completely covering one side of the backing member;
   c. a predetermined area of the valve being permanently bonded to an inside surface of the bottom closure end on one side only of the gassing hole and spaced from the gassing hole with the predetermined area being substantially less than the whole valve area and leaving the adhesive unbonded to the closure end around the balance of the gassing hole, the unbonded adhesive and the adjoining portion of the backing member overlying the gassing hole and bounding the gassing hole, the unbonded adhesive also being in mating sealing relationship with the surface of the bottom closure end to prevent propellant from escaping out the gassing hole; and
   d. the bonding of the valve and the backing member permitting the valve to bend back like a flap during propellant charging between the bonded predetermined area and the gassing hole and admit propellant and then bend back into the sealing relationship in response to propellant pressure in the dispenser after propellant charging.

2. The improvement claimed in claim 1 wherein the bottom closure end has a concave recess on the inside surface thereof, the gassing hole being in the recess, and the gassing valve overlying the recess.

3. The improvement claimed in claim 2 wherein the backing member is sufficiently strong to resist deformation into conformity with the surface of the recess at normal pressure and temperature conditions within the dispenser.

4. The improvement claimed in claim 3 wherein a seal is effected between the valve and the dispenser around the perimeter of the recess.

5. The improvement claimed in claim 1 wherein the adhesive is of the type which is solvent activated, and including a solvent vent adjacent the predetermined area between such area and the gassing hole and between the predetermined area and the balance of the valve to prevent spreading of solvent during the activation of adhesive outside the predetermined area.

6. The improvement claimed in claim 4 wherein the adhesive is of the type which is solvent activated, and including a solvent vent through the valve adjacent the predetermined area between such area and the gassing hole and between the predetermined area and the balance of the valve to prevent spreading of solvent during the activation of adhesive outside the predetermined area.

7. The improvement claimed in claim 6 wherein the backing member is of Mylar and the adhesive is nitrile rubber based.

8. In a pressurized dispenser of a type which maintains a product to be dispensed under pressure created by a propellant, a bottom closure end having a flat surface on the interior side thereof and a gassing hole from the exterior to the interior of the dispenser through the bottom closure end and the flat portion thereof, an improved ring sealing gassing valve of the flap type for preventing propellant from escaping from the dispenser comprising:

a. a backing member;
b. a layer of adhesive substantially covering one side of the backing member;
c. a recess having a concave upward curvature in the flat portion of the bottom closure end, the gassing hole passing through the wall of the recess;
d. the backing member being bonded to the flat portion of the bottom closure end with the adhesive only in a selected area away from the recess and to one side only of the gassing hole, the balance of the gassing valve adhesive not being bonded to the flat surface of the closure end so that a substantial portion of the perimeter of the recess is bounded by the gassing valve unbonded to the closure end; and
e. the gassing valve overlying the recess in spaced relation to the gassing hole and contacting the perimeter of the recess with unbonded adhesive at the junction of the recess with the flat portion of the closure end to define a line seal when the dispenser is charged with a propellant, the backing member being of sufficient stiffness for the return of the valve to its original position after the charging of the dispenser with a propellant.

9. The improvement claimed in claim 8 wherein the backing member has a solvent vent between the recess and the area of adhesion, the adhesive being of the solvent activated type, the solvent vent preventing the spreading of solvent outside the area of adhesion.

10. The improvement claimed in claim 8 wherein the adhesive is soft and pliant and fills interstices in the bottom closure end.

* * * * *